Dec. 27, 1932.   J. W. RANDOLPH   1,892,250
APPARATUS FOR SEED PLANTERS
Filed July 28, 1931
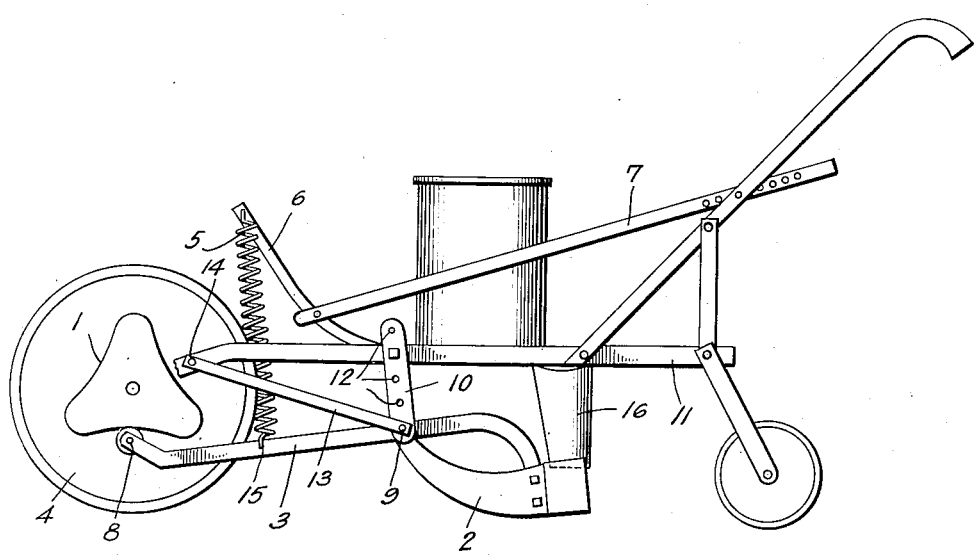
Inventor.
John W. Randolph
By:
Attorney.

Patented Dec. 27, 1932

1,892,250

UNITED STATES PATENT OFFICE

JOHN W. RANDOLPH, OF AUBURN, ALABAMA. DEDICATED TO THE FREE USE OF THE PUBLIC

APPARATUS FOR SEED PLANTERS

Application filed July 28, 1931. Serial No. 553,568.

(GRANTED UNDER THE ACT OF MARCH 3, 1883, AS AMENDED APRIL 30, 1928; 370 O. G. 757)

This application is made under the act of March 3, 1883, as amended by the act of April 30, 1928, and the invention herein described may be manufactured and used by or for the Government for governmental purposes without the payment to me of any royalty thereon.

I hereby dedicate the invention herein described to the free use of the public to take effect upon the granting of a patent to me.

My invention relates to improvements in the apparatus for planting seed in which the furrow opener will oscillate in a vertical plane, allowing the seed to be dropped in reference to the surface of the ground in a cycloid curve.

In my investigations I have learned from farmers and have observed that a stand of cotton in an adverse season is not obtained by any one depth of method of planting.

To obtain a wide variation in conditions of planting within the future desired spacing of cotton plants, I have devised a mechanical apparatus or attachment for placing cotton seed at different depths. By the use of my invention, seed may be planted at varying depths and places more seed in favorable condition for growth even with an adverse season.

The objects, therefore, of my invention are:—

First, to provide a mechanical apparatus for varying the depth of seed planting within a distance desired for a future placement of plants; second, to provide a practical attachment to any commercial planter for variation in depth planting, and third, to provide a method of planting which will increase the probable chance of stand for cotton in adverse seasons of cold, dry, or wet conditions.

Scientific data shows that certain conditions destroy a stand of cotton. As future conditions cannot be predicted at the time of planting, a system of planting which places seed in a variable depth furrow increases the normal period of plant seedlings reaching the surface of the ground. Furthermore, seed planted at different depths are under different conditions for germination. Therefore, with the combinations of the two factors, some seedling should have normal growth.

I attain the object of my invention by the apparatus illustrated in the accompanying drawing, shown as an attachment to a commercial planter. The variable depth planter attachment comprises essentially a cam 1 with lobes for varying the vertical movement of the seed furrow opener 2 by means of the lever arm 3 to the rear end of which seed furrow opener 2 is rigidly attached. Seed furrow opener 2 is so located and disposed that it oscillates vertically immediately in front of the lower end of seed chute 16 of the planter and the rear portion of furrow opener 2 extends on either side of seed chute 16 so as to hold furrow open while seed is being deposited but furrow opener 2 is not connected in any manner with seed chute 16. Cam 1 is attached so that it rotates with the planter wheel 4. Lever arm 3 is pivoted at point 9 to a vertical bar support 10 which is adjustably attached to the frame 11 of the planter by means of holes 12 and braced by the diagonal brace 13 attached at point 14 to the frame of the planter. The end of lever arm 3 is held against cam 1 by the spring 5, the tension of which may be varied by means of the adjustable members 6 and 7. Spring 5 is attached to lever arm 3 at point 15, by suitable means not shown. Friction between the end of lever arm 3 and cam 1 may be reduced by the use of wheel 8 suitably fastened to the end of the lever arm. The variation in depth of planting is governed by the height of the lobes of cam 1 and the location of pivot 9 relative to the ends of lever arm 3. The average depth of planting is controlled by adjustment 12 on support 10. Furrow opener 2 is lifted and lowered, respectively, by the lobes on cam 1 depressing and the tension in spring 5 raising the forward end of lever arm 3.

It will be understood that while the drawing shows the cam used for obtaining the variable vertical action, an eccentric or crank could be used. Furthermore, any other methods of obtaining the desired motion could be used directly for raising or lowering the furrow opener.

I am aware that prior to my invention many planters have been invented. I do not, therefore, claim such a combination broadly.

I claim:

1. In a planter having a traction wheel, the combination with a furrow opener attached to an oscillating lever arm, pivoted at its intermediate point to a support attached to said planter frame, of mechanism operated by the traction wheel of the planter and acting on said lever arm for variably forcing said furrow opener beneath the surface of the ground under the advance movement of said planter.

2. In a planter having a traction wheel, the combination with a furrow opener attached to an oscillating lever arm, pivoted at its intermediate point to a support secured to said planter frame, of mechanism operated by the traction wheel of the planter and acting on said lever arm for forcing said furrow opener to a constantly varying depth below the surface of the ground, under the advance movement of said planter.

3. An attachment for a seed planter having a traction wheel, comprising a furrow opener operated by an oscillating lever arm for forcing said furrow opener to varying depths below the surface of the ground, said oscillating lever arm being pivoted on a vertically adjustable support, and actuated by means of a cam attached to the wheel of said seed planter.

4. An attachment for a planter having a traction wheel, comprising a revolving cam attached to the planter wheel; a furrow opener actuated by said cam by means of an oscillating lever arm, pivoted at an intermediate point, on a support adjustably attached to said planter; and a spring, with tension adjusting members, adapted to hold said oscillating lever arm in contact with said cam.

5. An attachment for a planter having a traction wheel, comprising a revolving lobed cam attached to the planter wheel; a furrow opener actuated by said cam by means of an oscillating lever arm, pivoted at an intermediate point, on a vertical support adjustably attached to said planter; and a spring, with tension adjusting members, adapted to hold said oscillating lever arm in contact with said cam.

JOHN W. RANDOLPH.